J. A. KEELER.
Land-Roller.

No. 165,839.

Patented July 20, 1875.

WITNESSES:
P. C. Dieterich
W. C. McArthur

INVENTOR.
Julius A. Keeler
per T. R. Alexander
ATTORNEY

UNITED STATES PATENT OFFICE.

JULIUS A. KEELER, OF OLATHE, KANSAS.

IMPROVEMENT IN LAND-ROLLERS.

Specification forming part of Letters Patent No. 165,839, dated July 20, 1875; application filed June 9, 1875.

*To all whom it may concern:*

Be it known that I, JULIUS A. KEELER, of Olathe, in the county of Johnson and State of Kansas, have invented certain new and useful Improvements in Land-Rollers; and I do hereby declare that the following is a full, clear, and exact description thereof, reference being had to the accompanying drawings, and to the letters of reference marked thereon, which form part of this specification.

The nature of my invention consists in the construction and arrangement of a land or field roller, as will be hereinafter more fully set forth.

In order to enable others skilled in the art to which my invention appertains to make and use the same, I will now proceed to describe its construction and operation, referring to the annexed drawing, in which—

Figure 1:
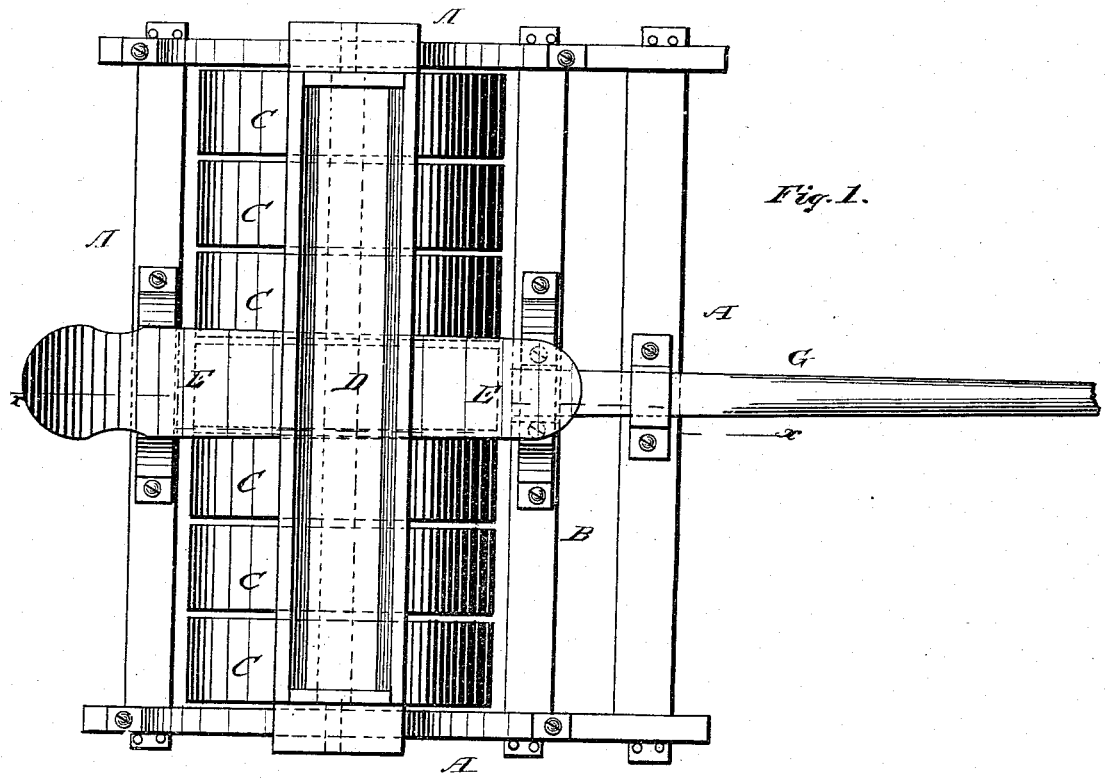
Figure 2:
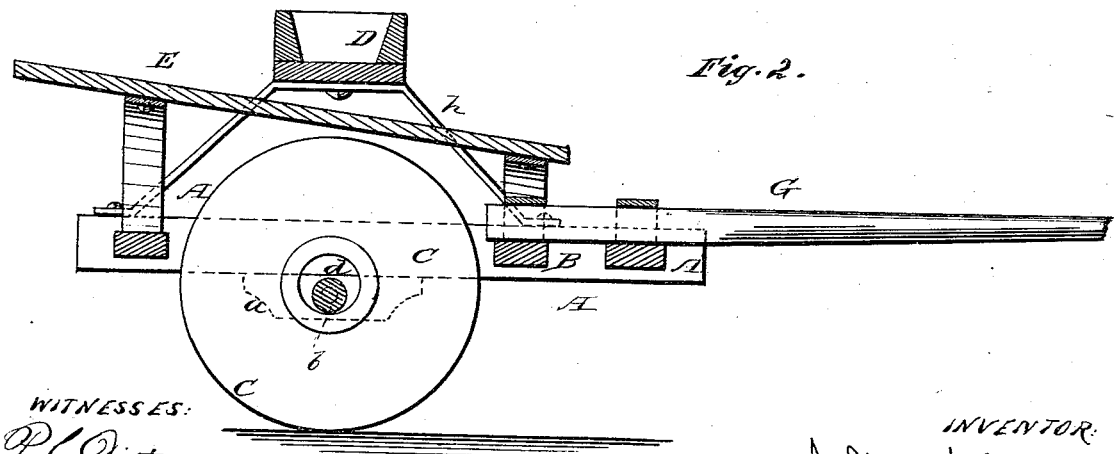

Figure 1 is a plan view of my land or field roller; and Fig. 2 is a section of the same through the line $x\,x$, Fig. 1.

A represents a rectangular frame of any suitable dimensions, provided with a cross-girt, B, in rear of the front bar of the frame. On the under sides of the side pieces of the frame are secured suitable boxes $a$, in which a revolving shaft or axle, $b$, has its bearings. On this axle are placed a number of wheels or rollers, C C, the center apertures $d$ of which are made considerably larger than the axle $b$, as shown in Fig. 2, so that the rollers will easily adjust themselves to any unevenness in the ground over which they pass. D represents a stone-box to increase the weight of the rollers. It is supported from the frame A by braces $h\,h$ above the rollers. E is the driver's seat, arranged behind the stone-box to balance the machine and relieve the pressure on the horses' necks. G is the tongue or pole, fastened in suitable loops in the center of the front bar and cross-girt of the frame. By the rollers revolving on the axle and the axle revolving in its bearings the friction is entirely on the bearings.

The holes $d$ in the rollers may be made beveled from each side to the center. This roller may be used for rolling the ground between corn-rows by simply removing the middle roller and inserting a plank in place thereof. It is also applicable in drilling grain and planting.

Having thus fully described my invention, what I claim as new, and desire to secure by Letters Patent, is—

In a land-roller, a series of wheels or rollers, C, having enlarged central apertures $d\,d$, and revolving around a common axle, substantially as and for the purposes herein set forth.

In testimony that I claim the foregoing as my own I affix my signature in presence of two witnesses.

JULIUS A. KEELER.

Witnesses:
ELIAS RHOADES, Jr.,
WILL. D. LINTON.